United States Patent
Zvibel

(10) Patent No.: US 8,561,027 B2
(45) Date of Patent: Oct. 15, 2013

(54) REFLECTION CAPABILITY IN STATIC PROGRAMMING LANGUAGES

(75) Inventor: Liran Zvibel, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 837 days.

(21) Appl. No.: 12/726,148

(22) Filed: Mar. 17, 2010

(65) Prior Publication Data

US 2011/0231816 A1 Sep. 22, 2011

(51) Int. Cl.
*G06F 9/44* (2006.01)
*G06F 9/45* (2006.01)

(52) U.S. Cl.
USPC ............ 717/124; 717/106; 717/140; 717/148

(58) Field of Classification Search
None
See application file for complete search history.

(56) References Cited

U.S. PATENT DOCUMENTS

| 2004/0237070 A1 | 11/2004 | Roth et al. | |
|---|---|---|---|
| 2008/0022267 A1* | 1/2008 | Johnson et al. | 717/143 |
| 2009/0024986 A1 | 1/2009 | Meijer et al. | |
| 2009/0150420 A1* | 6/2009 | Towner | 707/101 |

* cited by examiner

*Primary Examiner* — Chuck Kendall
(74) *Attorney, Agent, or Firm* — Griffiths & Seaton PLLC

(57) ABSTRACT

Methods and computer program products for enabling reflection capability in the C programming language are provided. One method includes generating a database for a program written in the C programming language when compiling the program, wherein the database is based on structures included within the program. The method further includes storing the database in memory and utilizing the database during run-time to enable the program to observe and modify its own structure and behavior. One computer program product includes executable portions for performing the above method. Another method includes creating a database for a program written in the C programming language, wherein the type database is based on structures included within the program and is created prior to the program being compiled. This method further comprises storing the database in memory and utilizing the database during run-time to enable the program to observe and modify its own structure and behavior.

20 Claims, 4 Drawing Sheets

REFLECTION CAPABILITY IN STATIC PROGRAMMING LANGUAGES

FIELD OF THE INVENTION

The present invention generally relates to programming languages, and more particularly relates to systems, methods, and computer program products enabling reflection capability in static programming languages.

BACKGROUND OF THE INVENTION

In computer programming, reflection is the process by which a computer program can observe and modify its own structure and behavior during run-time. In typical computer programs, instructions are executed and data is processed; however, in some programming languages, programs can also treat instructions as data and data as instructions, and therefore can make reflective modifications during run-time. While reflection is commonly used in newer high-level virtual machine programming languages, reflection is generally unavailable in older static programming languages.

SUMMARY OF THE DESCRIBED EMBODIMENTS

Various embodiments provide a method for enabling reflection capability in the C programming language. One embodiment comprises generating, by a compilation server, a type-information database for a computer program written in the C programming language when compiling the computer program, wherein the type-information database is based on structures included within the computer program. This method further comprises storing, by a processor in communication with the compilation server, the type-information database in memory and the processor utilizing the type-information database during run-time to enable the computer program to observe and modify its own structure and behavior.

Another embodiment comprises creating a type-information database for a computer program written in the C programming language, wherein the type-information database is based on structures included within the computer program and created prior to the computer program being compiled. This method further comprises storing the type-information database in memory and utilizing, by a processor in communication with the memory, the type-information database during run-time to enable the computer program to observe and modify its own structure and behavior.

Other embodiments provide a computer program product for enabling reflection capability in the C programming language. One computer program product comprises a computer-readable storage medium including computer-readable program code portions stored therein, the computer-readable program code portions comprising a first executable portion for generating a type-information database for a computer program written in the C programming language when compiling the computer program, wherein the type-information database is based on structures included within the computer program. The computer-readable code portion further comprising a second executable portion for storing the type-information database in memory and a third executable portion for utilizing the type-information database during run-time to enable the computer program to observe and modify its own structure and behavior.

Another computer program product comprises a computer-readable storage medium including computer-readable program code portions stored therein, the computer-readable program code portions comprising a first executable portion comprising a type-information database for a computer program written in the C programming language and a second executable portion for utilizing the type-information database during run-time to enable the computer program to observe and modify its own structure and behavior. In this embodiment, the type-information database is based on structures in the computer program.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
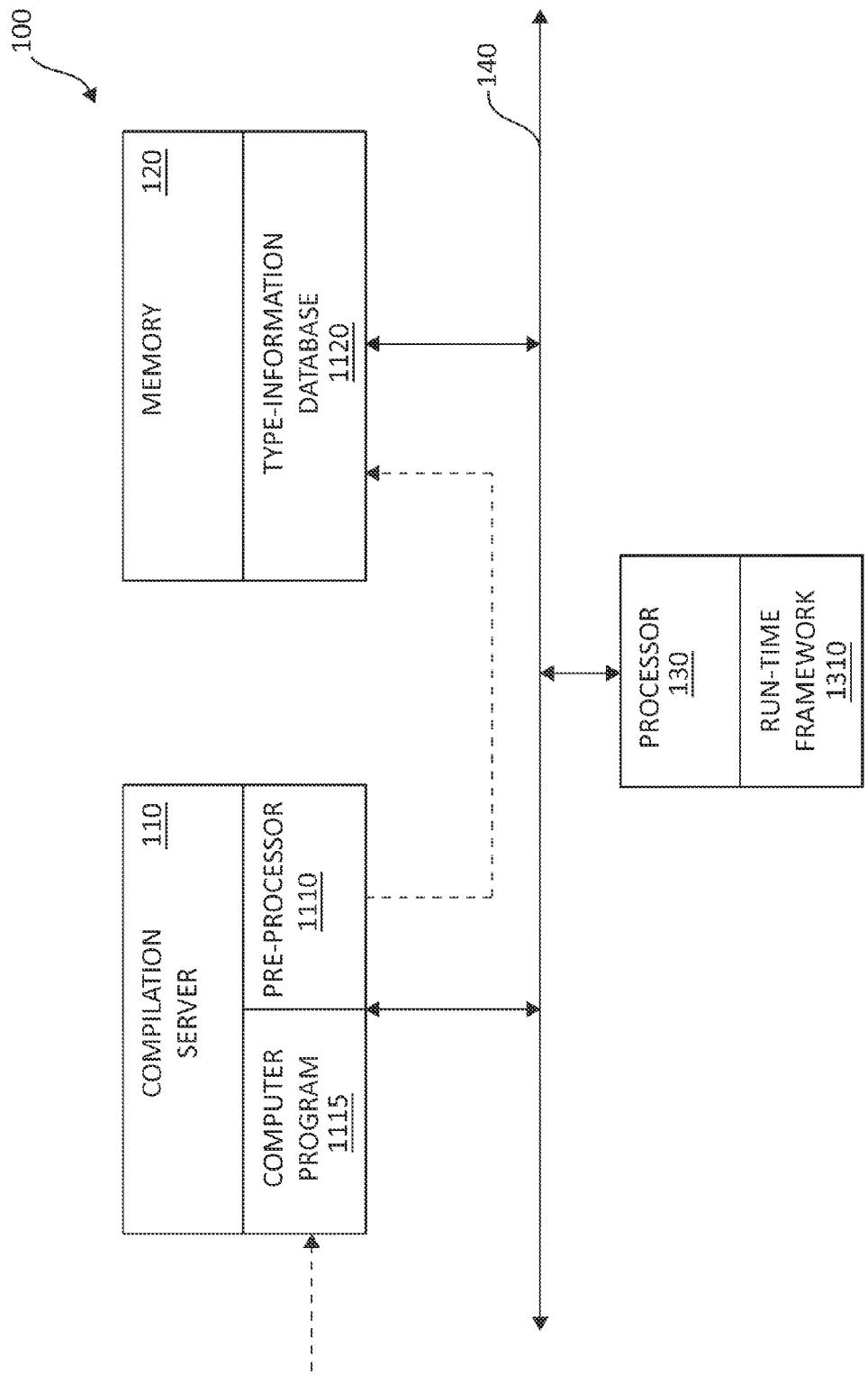
FIG. 1 is a block diagram of one embodiment of a system for enabling reflection capability in the C programming language.

Turning now to the figures, FIG. 1 is a block diagram of one embodiment of a system 100 for enabling reflection capability in the C programming language. At least in the illustrated embodiment, system 100 comprises a compilation server 110, a memory 120, and a processor 130 coupled to one another via a bus 140 (e.g., a wired and/or wireless bus).

Compilation server 110 is configured to store a pre-processor 1110. Furthermore, compilation server 110 is configured to receive and compile a computer program 1115 written in the C programming language.

Pre-processor 1110 is configured to identify each structure in computer program 1115 while computer program 1115 is being compiled. Pre-processor 1110 is further configured to create a type-information database 1120 including definitions for the various identified structures. In one embodiment, pre-processor 1110 is configured to deduce the various definitions from the DWARF debugging data generated when compilation server 110 compiles computer program 1115. That is, pre-processor 1110 utilizes the DWARF debugging data generated during compiling of computer program 1115 to create/generate type-information database 1120. Moreover, pre-processor 1110 is configured to add a field stored at the beginning of each identified structure in computer program 1115 when compiling computer program 1115 so that each added field can be filled with a reference to a particular definition in type-information database 1120. Type-information database 1120 is then saved, via processor 130, to memory 120.

Memory 120 may be any type of memory known in the art or developed in the future. For example, memory 120 may be random access memory (RAM), flash memory, a disk, a tape, or the like computer-readable storage mediums.

In addition to being configured to save type-information database 1120 to memory 120, processor 130 is configured to utilize type-information database 1120 during run-time to enable computer program 1115 to observe and modify its own structure and behavior. Specifically, processor 130 is configured to store a run-time framework 1310 and utilize run-time framework 1310 to enable computer program 1115 during run-time to observe and modify its own structure and behavior. That is, run-time framework 1310 utilizes the data stored in type-information database 1120 to point to a particular definition stored in type-information database 1120 during run-time, which enables computer program 1115 to observe and modify its own structure and behavior.

Figure 2:
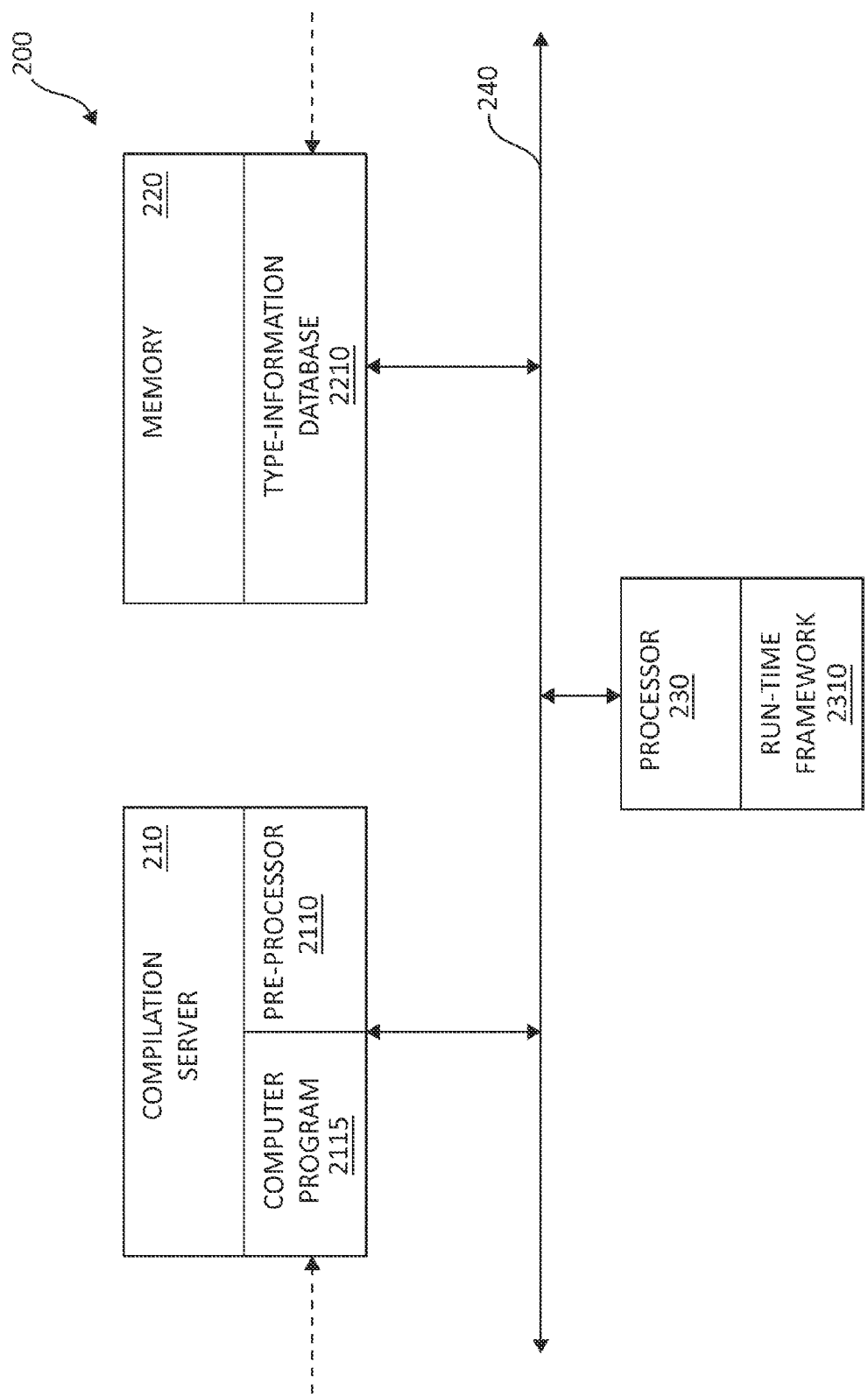
FIG. 2 is a block diagram of another embodiment of a system for enabling reflection capability in the C programming language.

Turning to FIG. 2, FIG. 2 is a block diagram of another embodiment of a system 200 for enabling reflection capability in the C programming language. At least in the illustrated embodiment, system 200 comprises a compilation server 210, a memory 220, and a processor 230 coupled to one another via a bus 240 (e.g., a wired and/or wireless bus).

Compilation server 210 may be any compilation server known in the art or developed in the future. That is, compilation server 210 is configured to receive and compile a computer program 2115 written in the C programming language. Moreover, compilation server 210 is configured to store a pre-processor 2110 that is configured to add a field to the beginning of each structure in computer program 2115 when compiling computer program 2115 so that each added field can be filled with a reference to a particular definition in a type-information database 2210 (discussed below).

Memory 220 may be an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one embodiment, memory 220 is configured to store a type-information database 2210 that includes definitions for various structures included within computer program 2115. Type-information database 2210 is created/generated (e.g., by a user or programmer) prior to computer program 2115 being transmitted to and compiled by compilation server 210. Type-information database 2210 stores various definitions that are similar to the DWARF debugging data created/generated by compilation server 210 when compilation server 210 compiles computer program 2115.

Processor 230 is configured to utilize type-information database 2210 during run-time to enable computer program 2115 to observe and modify its own structure and behavior. Specifically, processor 230 is configured to store a run-time framework 2310 and utilize run-time framework 2310 to enable computer program 2115 to observe and modify its own structure and behavior during run-time. That is, run-time framework 2310 utilizes the data stored in type-information database 2210 to point to a particular definition stored in type-information database 2210 during run-time, which enables computer program 2115 to observe and modify its own structure and behavior.

Figure 3:
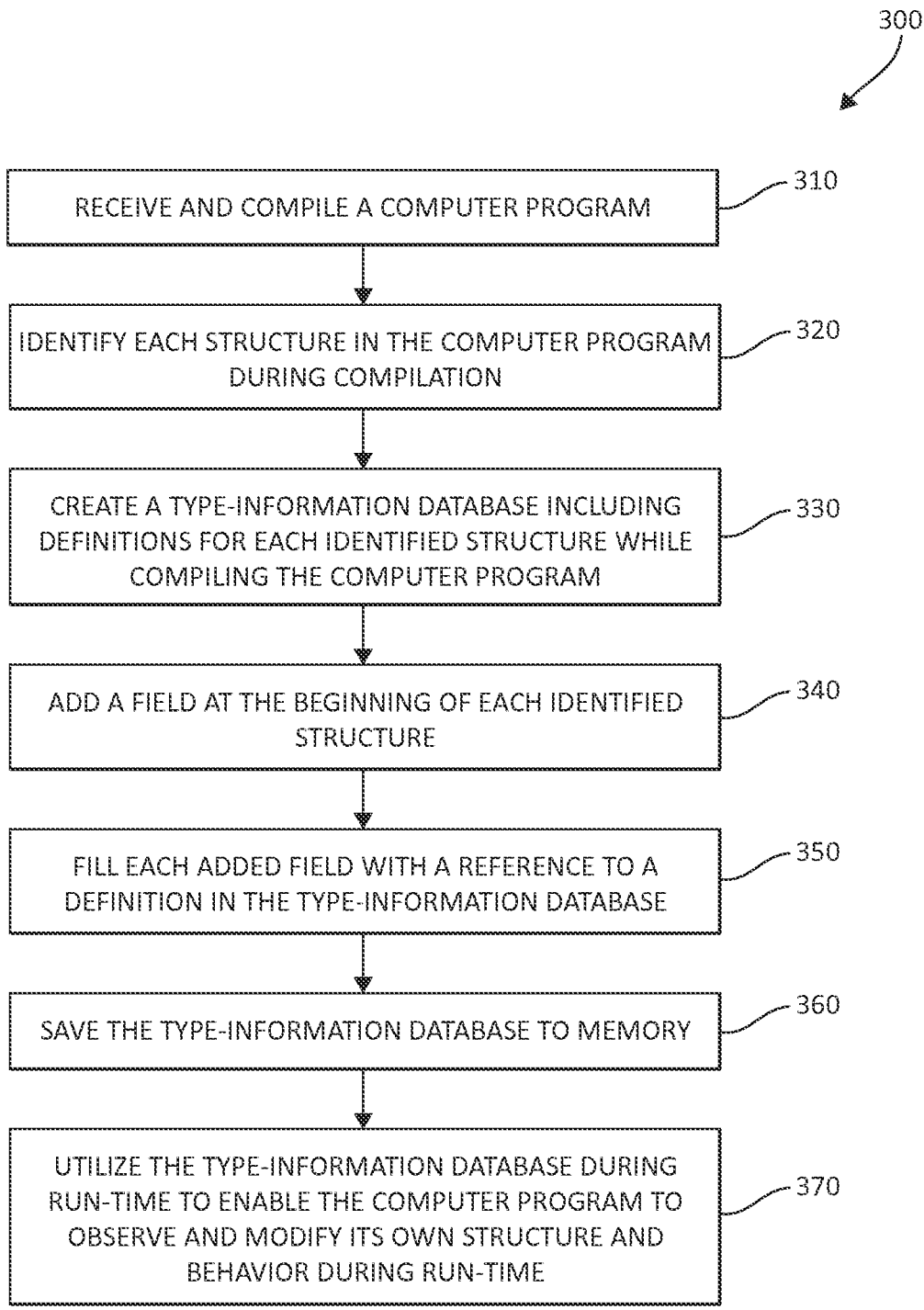
FIG. 3 is a flow diagram of one embodiment of a method for enabling reflection capability in the C programming language.

With reference now to FIG. 3, FIG. 3 is a flow diagram of one embodiment of a method 300 for enabling reflection capability in the C programming language. At least in the illustrated embodiment, method 300 begins by receiving and compiling a computer program (e.g., computer program 1115) written in the C programming language at a compilation server (e.g., compilation server 110) (block 310).

Each structure in computer program 1115 is identified while computer program 1115 is being compiled (block 320).

A pre-processor (e.g., pre-processor 1110) then creates a type-information database (e.g., type-information database 1120) including definitions for the various identified structures (block 330). The definitions are deduced from the DWARF debugging data generated when compilation server 110 compiles computer program 1115. That is, the DWARF debugging data generated during compiling of computer program 1115 is utilized to create/generate type-information database 1120.

A field is added to the beginning of each identified structure in computer program 1115 when compiling computer program 1115 (block 340). Each added field is filled with a reference to a particular definition in type-information database 1120 (block 350). Type-information database 1120 is then saved, via processor 130, to memory (e.g., memory 120) (block 360).

Type-information database 1120 is then utilized during run-time to enable computer program 1115 to observe and modify its own structure and behavior (block 370). Specifically, a run-time framework (e.g., run-framework 1310) stored in a processor (e.g. processor 130) is utilized to enable computer program 1115 to observe and modify its own structure and behavior. That is, run-time framework 1310 utilizes the data stored in type-information database 1120 to point to a particular definition stored in type-information database 1120 during run-time, which enables computer program 1115 to observe and modify its own structure and behavior.

Figure 4:
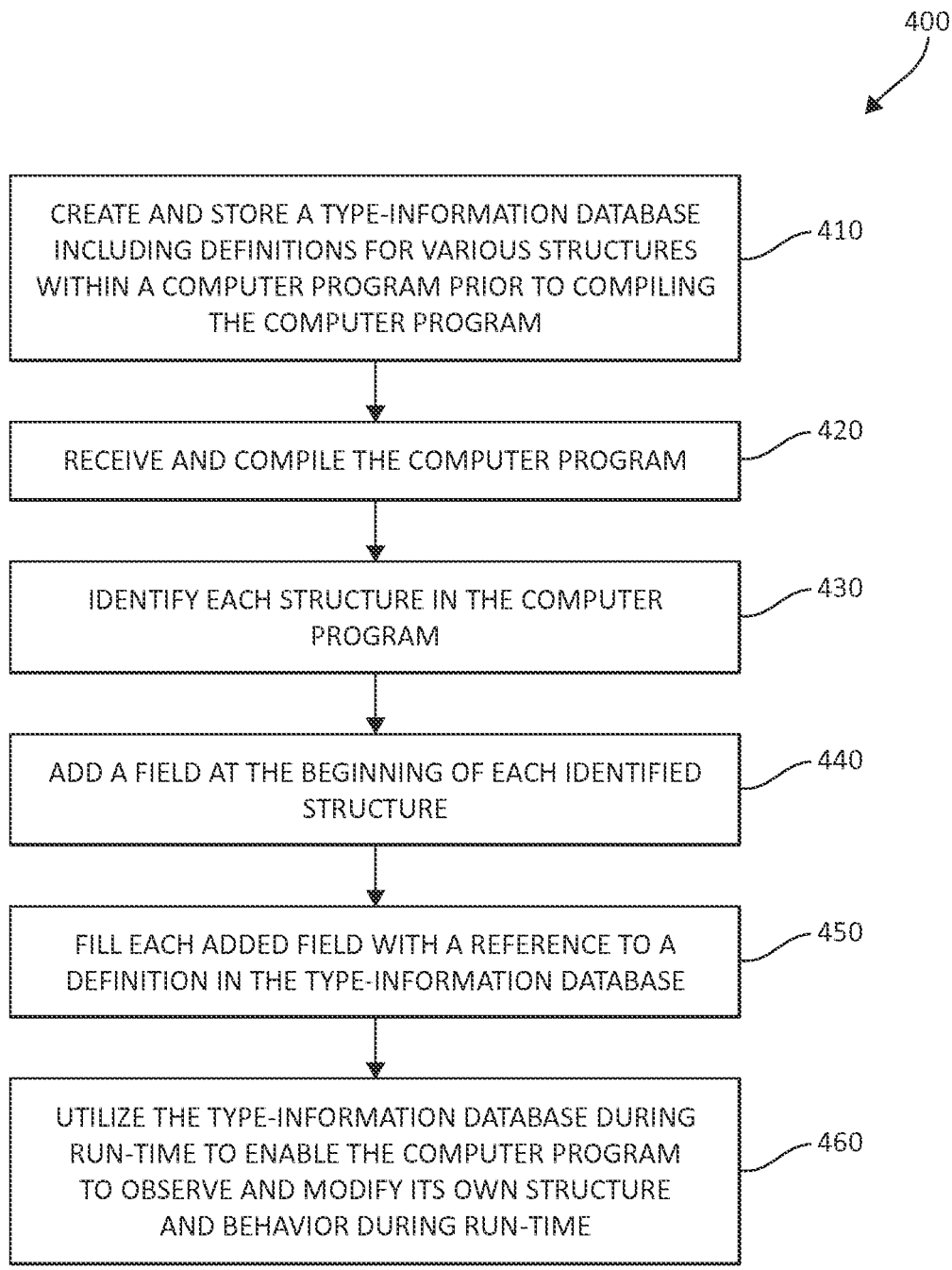
FIG. 4 is a flow diagram of another embodiment of a method for enabling reflection capability in the C programming language.

With reference now to FIG. 4, FIG. 4 is a block diagram of another embodiment of a method 400 for enabling reflection capability in the C programming language. At least in the illustrated embodiment, method 400 begins by creating (e.g., by a user or programmer) and storing (e.g., in memory 220) a type-information database (e.g., type-information database 2210) that includes definitions for various structures included within a computer program (e.g., computer program 2115) written in the C programming language (block 410).

Type-information database 2210 is created prior to computer program 2115 being transmitted to and compiled by a compilation server (e.g., compilation server 210). Type-information database 2210 stores various definitions that are similar to the DWARF debugging data created/generated by compilation server 210 when compilation server 210 compiles computer program 2115.

A compilation server (e.g., compilation server 210) receives and compiles computer program 2115 (block 420). A pre-processor (e.g., pre-processor 2110) stored in compilation server 210 identifies each structure in computer program 2115 while computer program 2115 is being compiled (block 430). A field is added to the beginning of each identified structure while computer program 2115 is being compiled (block 440). Each added field is filled with a reference to a particular definition in type-information database 2210 (block 450).

A processor (e.g., processor 230) utilizes type-information database 2210 during run-time to enable computer program 2115 to observe and modify its own structure and behavior (block 460). Specifically, a run-time framework (e.g., run-time framework 2310) stored in processor 230 utilizes type-information database 2210 to enable computer program 2115 to observe and modify its own structure and behavior during run-time. That is, run-time framework 2310 utilizes the data stored in type-information database 2210 to point to a particular definition stored in type-information database 2210 during run-time, which enables computer program 2115 to observe and modify its own structure and behavior.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a computer-readable storage medium. A computer readable storage medium may be, for example, but not limited to, an electronic, magnetic, optical, crystal, polymer, electromagnetic, infrared, or semiconductor system, apparatus, or device, or any suitable combination of the foregoing. Examples (a non-exhaustive list) of computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Program code embodied on a computer-readable medium may be transmitted using any appropriate medium, including but not limited to wireless, wired, optical fiber cable, radio frequency (RF), etc., or any suitable combination of the foregoing. Computer program code for carrying out operations for aspects of the present invention may be written in any static language, such as the "C" programming language or similar programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A method for enabling reflection capability in the C programming language, comprising:
   generating, by a compilation server, a type-information database for a computer program written in the C programming language when compiling the computer program, the type-information database based on structures included within the computer program;
   storing, by a processor in communication with the compilation server, the type-information database in memory; and
   utilizing, by the processor, the type-information database during run-time to enable the computer program to observe and modify its own structure and behavior.

2. The method of claim 1, wherein the type-information database is deduced from DWARF debugging data generated when the computer program is compiled.

3. The method of claim 2, wherein generating the type-information database comprises deducing the type-information database from the DWARF debugging data utilizing a pre-processor stored in the compilation server.

4. The method of claim 3, wherein utilizing the type-information database during run-time comprises utilizing a run-time framework stored in the processor that enables the computer program to observe and modify its own structure and behavior.

5. The method of claim 1, wherein generating the type-information database comprises:
    identifying each structure in the computer program when compiling the computer program; and
    adding a field to a beginning of each identified structure in the computer program when compiling the computer program so that each added field can be filled with a reference to a particular definition in the type-information database.

6. The method of claim 5, wherein utilizing the type-information database comprises pointing to the particular definition during run-time to enable the computer program to observe and modify its own structure and behavior.

7. A computer program product for enabling reflection capability in the C programming language, the computer program product comprising a computer-readable storage medium including computer-readable program code portions stored therein, the computer-readable program code portions comprising:
    a first executable portion for generating a type-information database for a computer program written in the C programming language when compiling the computer program, the type-information database based on structures included within the computer program;
    a second executable portion for storing the type-information database in memory; and
    a third executable portion for utilizing the type-information database during run-time to enable the computer program to observe and modify its own structure and behavior.

8. The computer program product of claim 7, wherein the type-information database is deduced by the first executable portion from DWARF debugging data generated when the computer program is compiled.

9. The computer program product of claim 8, wherein the first executable portion comprises a first executable sub-portion for deducing the type-information database from the DWARF debugging data via a pre-processor.

10. The computer program product of claim 9, wherein the third executable portion comprises a second executable sub-portion for utilizing a run-time framework that enables the computer program to observe and modify its own structure and behavior.

11. The computer program product of claim 7, wherein the first executable portion comprises:
    a first executable sub-portion for identifying each structure in the computer program when compiling the computer program; and
    a second executable sub-portion for adding a field to a beginning of each identified structure in the computer program when compiling the computer program so that each added field can be filled with a reference to a particular definition in the type-information database.

12. The computer program product of claim 11, wherein the third executable portion comprises an executable sub-portion for pointing to the particular definition during run-time to enable the computer program to observe and modify its own structure and behavior.

13. A method for enabling reflection capability in the C programming language, comprising:
    creating a type-information database for a computer program written in the C programming language, the type-information database based on structures included within the computer program and created prior to the computer program being compiled;
    storing the type-information database in memory; and
    utilizing, by a processor in communication with the memory, the type-information database during run-time to enable the computer program to observe and modify its own structure and behavior.

14. The method of claim 13, wherein utilizing the type-information database during run-time comprises utilizing a run-time framework stored in the processor that enables the computer program to observe and modify its own structure and behavior.

15. The method of claim 13, wherein creating the type-information database comprises:
    identifying each structure in the computer program; and
    adding a field to a beginning of each identified structure in the computer program so that each added field can be filled with a reference to a particular definition in the type-information database.

16. The method of claim 15, wherein utilizing the type-information database comprises pointing to the particular definition during run-time to enable the computer program to observe and modify its own structure and behavior.

17. A computer program product for enabling reflection capability in the C programming language, the computer program product comprising a computer-readable storage medium including computer-readable program code portions stored therein, the computer-readable program code portions comprising:
    a first executable portion comprising a type-information database for a computer program written in the C programming language, the type-information database based on structures in the computer program; and
    a second executable portion for utilizing the type-information database during run-time to enable the computer program to observe and modify its own structure and behavior.

18. The computer program product of claim 17, wherein the second executable portion comprises a sub-portion for utilizing a run-time framework stored in the processor that enables the computer program to observe and modify its own structure and behavior.

19. The computer program product of claim 17, wherein the first executable portion comprises:
    a first executable sub-portion for identifying each structure in the computer program; and
    a second executable sub-portion for adding a field to a beginning of each identified structure in the computer program so that each added field can be filled with a reference to a particular definition in the type-information database.

20. The computer program product of claim 19, wherein the second executable portion comprises a sub-portion for pointing to the particular definition during run-time to enable the computer program to observe and modify its own structure and behavior.

* * * * *